Dec. 20, 1949     H. H. GRIMM     2,491,494
DEVICE FOR MEASURING SIGNAL FREQUENCIES
Filed Aug. 28, 1945     4 Sheets-Sheet 1

INVENTOR
HENRY H. GRIMM

By William D. Hall
ATTORNEY

TO CAPACITOR IN
LOCAL OSCILLATOR 4

Dec. 20, 1949　　　　H. H. GRIMM　　　　2,491,494
DEVICE FOR MEASURING SIGNAL FREQUENCIES
Filed Aug. 28, 1945　　　　　　　　　　4 Sheets-Sheet 3

| DIAL READING | FUNDAMENTAL FREQUENCY | SECOND HARMONIC | THIRD HARMONIC | FOURTH HARMONIC | FIFTH HARMONIC |
|---|---|---|---|---|---|
| | | | | | |
| | | | | | |
| | | | | | |
| 2048.5 | 128.63 | 257.26 | 385.89 | 514.52 | 643.15 |
| | | | | | |
| | | | | | |
| | | | | | |
| DIAL SHIFT READING | 56 | 28 | 19 | 14 | 11 |

INVENTOR
HENRY H. GRIMM
BY William D. Hall
ATTORNEY

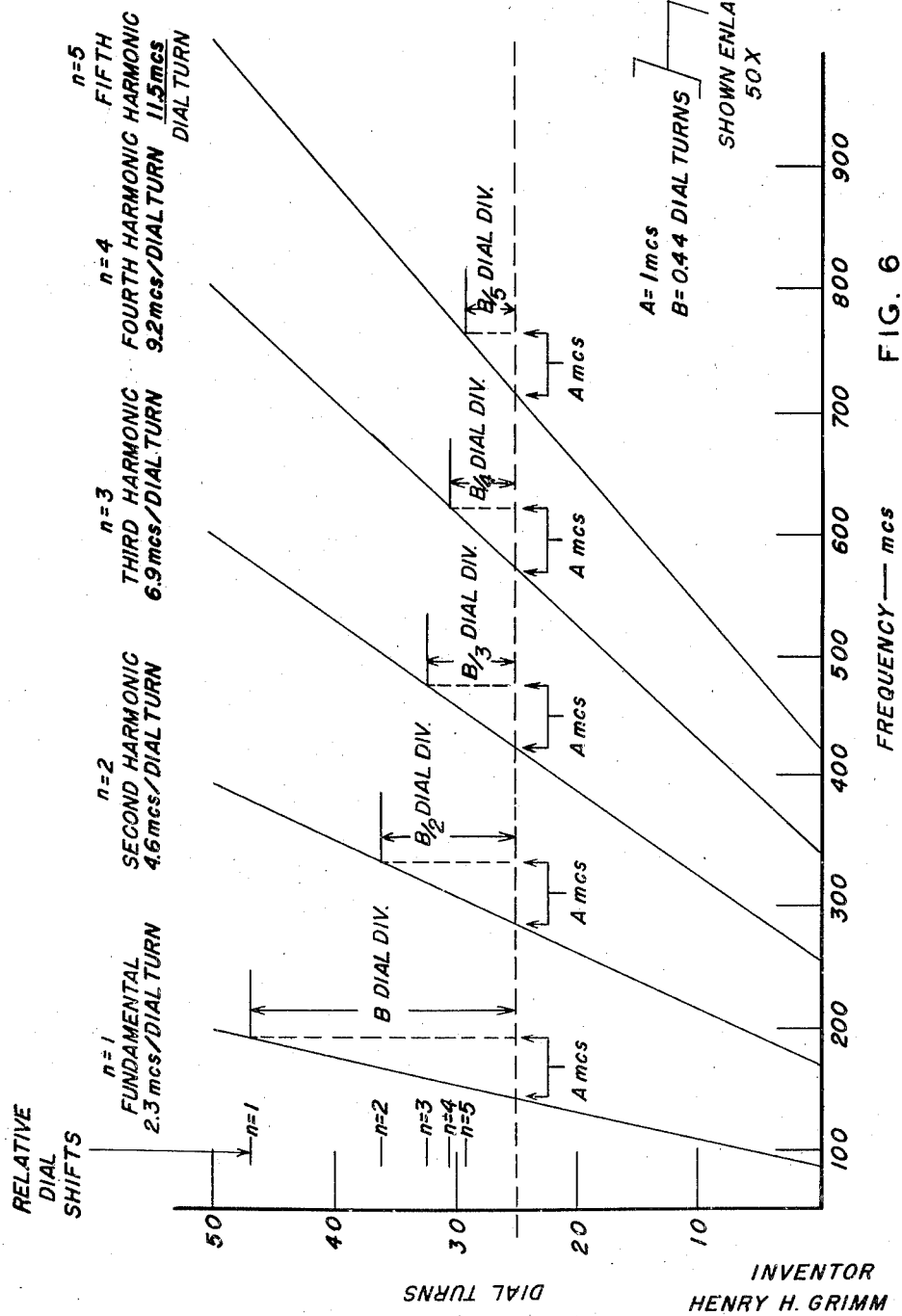

Patented Dec. 20, 1949

2,491,494

UNITED STATES PATENT OFFICE 2,491,494

DEVICE FOR MEASURING SIGNAL FREQUENCIES

Henry H. Grimm, Dayton, Ohio

Application August 28, 1945, Serial No. 613,195

4 Claims. (Cl. 250—39)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a radio signal frequency measuring device and more particularly to a means and a method for determining the frequency of an intercepted unknown radio signal using a heterodyne frequency meter.

Conventional practice in making frequency measurements with heterodyne frequency meters has led to errors which arise out of mistaking a harmonic of a locally generated reference signal for the fundamental of such signal or another harmonic thereof. Inexperienced personnel are frequently confused in attempting to distinguish between the various bands including the individual harmonics and fundamental of the local signal with the result that frequency measurements may be in error by several hundred percent.

An object of this invention is to eliminate errors of the foregoing character by providing an improved frequency measuring device the operation of which requires that certain steps be performed to insure that the correct frequency reading is obtained.

A further object is to enable the determination of harmonic number to be performed mechanically without the use of mathematics.

Another object is to provide a method of making frequency measurements that involves following easily understood instructions regarding the use of a frequency meter and a table of calibrated values that are adjuncts of the present invention.

These and other objects will be apparent to those who are informed in the field of radio signal frequency determinations, as the description of the invention progresses.

In the drawings:

Fig. 2 is a plan view of a frequency indicating dial assembly portion of the device, the circuit of which is shown in Fig. 1, mounted upon an instrument panel, a fragment of which is shown, within an aeroplane or the like;

Fig. 4 is an illustrative fragmentary portion of predetermined calibration values on a table that is used in connection with the present invention;

Fig. 5 is a plan view of a modified form of frequency indicating dial assembly of the device, the circuit of which is shown in Fig. 1, mounted upon the instrument panel, a fragment of which is shown, within an aeroplane or the like; and Fig. 6 is a graphical presentation of a fundamental and a plurality of harmonics thereof in terms of the frequencies plotted against the dial turns readings.

Figure 2:
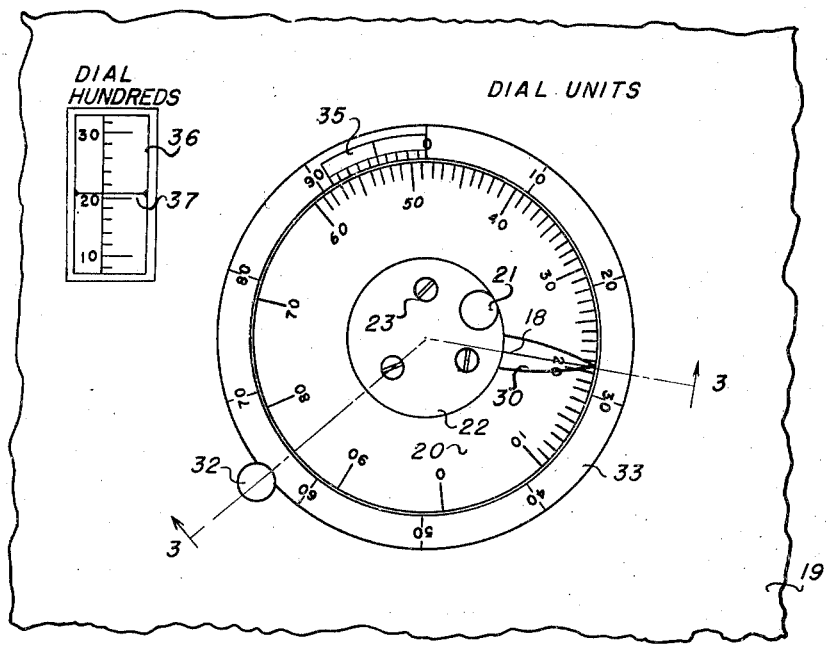
Figure 1:
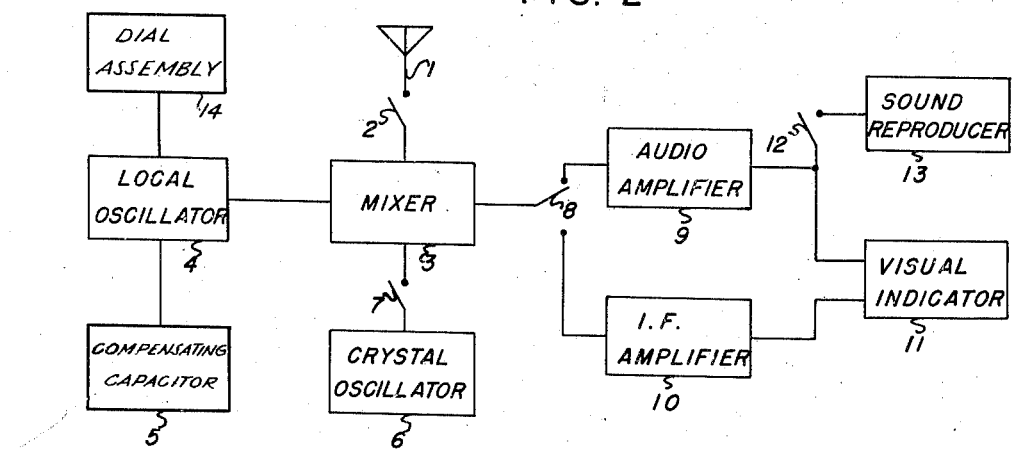
Fig. 1 is a block diagram of the overall circuit of a device that comprises an illustrative embodiment of the present invention.

The circuit shown in Fig. 1 of the accompanying drawings comprises a signal intercepting antenna 1 that preferably is removably connected through a switch 2 to a mixer stage 3 to which a local oscillator 4 feeds its output. The local oscillator 4 is tuned by a variable capacitor (not shown) geared to the dial assembly 14 that is shown in Fig. 2. The tuning of the local oscillator 4 is compensated for temperature by a tuning capacitor 5, that serves as a trimmer condenser to adjust the local oscillator frequency to correspond to a dial reading. A crystal oscillator 6 is connected to the mixer 3 through a switch 7 so that the output of the crystal oscillator 6 may be fed into the mixer stage 3 and may be used for checking calibration of the equipment.

The output of the mixer stage 3 is fed selectively through a single-pole double-throw amplifier switch 8 into either an audio amplifier stage 9 or an intermediate-frequency amplifier stage 10. The output of the audio amplifier stage 9 is applied to a visual indicator stage 11 and, releasably through a switch 12, to a sound reproducer 13. The intermediate-frequency amplifier stage 10 feeds its output to the visual indicator stage 11 which preferably is a vacuum tube voltmeter type of indicator. The designated visual indicator stage 11 is preferred because it responds to beat note frequencies in both the video and in the intermediate-frequency ranges.

Figure 3:
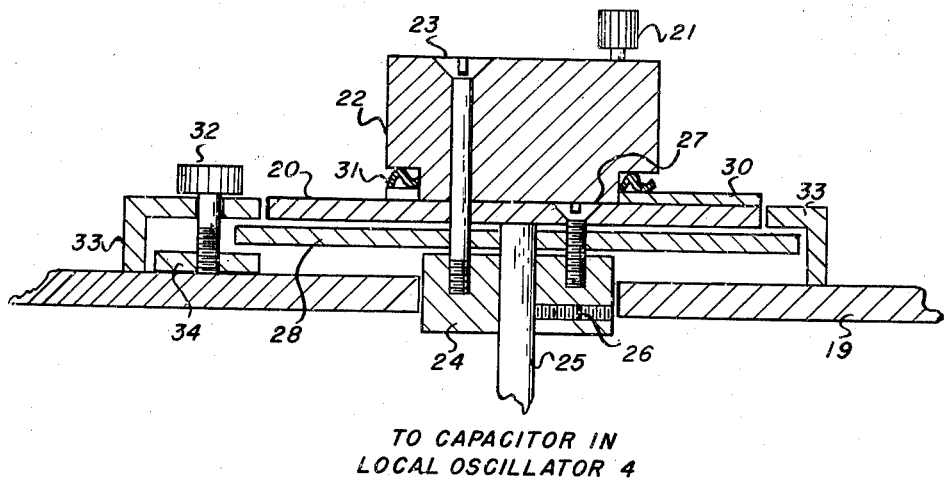
Fig. 3 is a section taken along the line 3—3 in Fig. 2.

Dial elements of the contemplated device are mounted within an instrument panel 19, a fragmentary portion of which is shown, with the dial elements of the device mounted therein, in Fig. 2 of the drawings. The dial element that is designated as Dial units in the drawing, and that is shown in plan view in Fig. 2 and in section in Fig. 3, is of a usual form and its general assembly is shown herein for clarity of explanation, it being understood that other types of dial assembly may be substituted therefor without departing from the scope of the present invention. The dial element that is designated Dial hundreds is associated with the Dial units element and indicates the number of complete rotations of an indicator disc 20 element thereof. A container, not shown, for housing the components of the circuit shown in Fig. 1 is mounted upon the rear side of and is supported by the panel 19.

The dial assembly that is shown in Figs. 2 and 3 is used to tune the local oscillator that is shown in Fig. 1 and in determining the frequency of an unknown signal that has been intercepted by the antenna 1. The dial element, that is shown in Figs. 2 and 3 as being mounted upon the instrument panel 19, comprises a rotatable indicator disc 20 which is spun by causing a pivoted knob 21, attached thereto through a mount 22, to describe a circular course in a plane that is parallel to the disc 20. The mount 22 is attached by a plurality of screws 23 to another mount 24 that is journaled in an aperture in the instrument panel 19 and that provides a mounting for a shaft 25 which is fixed against rotation with respect to the mount 24 by means of a set screw 26. The shaft 25 connects through gearing to capacitor means, not shown, that serves for tuning the local oscillator 4. The indicator disc 20 is disposed between the mounts 22 and 24 and is also immovably attached to the mount 24 by a plurality of screws 27 with a circular locking disc 28 of greater diameter than the indicator disc 20 interposed between the mount 24 and the indicator disc 20.

A movable transparent runner arm 30 that has a reference or runner hairline 18 extending longitudinally midway between the lateral edges thereof, is disposed between the mount 22 and the disc 20 with a friction clutch spring 31 disposed therebetween so that the runner arm 30 normally moves with the disc 20, or can be moved with respect thereto when the disc 20 is locked against rotation.

The dics 20 is locked against rotation by turning a locking screw 32 that is rotatably journaled in a fixed indicator ring 33 disposed radially outwardly of the disc 20, this disc being immovably secured to the outer face of the instrument panel 19 in any desired manner. The locking screw 32 is threaded into a non-rotatable locking block 34 so that the rotation of the locking screw 32 in the clockwise direction, as viewed in Fig. 2, draws the locking block 34 toward the head of the locking screw 32 to clamp the peripheral edge of the locking disc 28 between the block 34 and the underface of the immovable ring 33 and thereby prevent the rotation of the disc 20, and so that the rotation of the locking screw 32 in the opposite or counterclockwise direction releases the disc 20 from its locked position. The indicator disc 20 is inscribed along its upper face adjacent its peripheral edge with one hundred equally spaced subdivisions. The ring 33 has ten or more equally spaced subdivisions inscribed thereon and preferably is provided with a vernier segment 35. The subdivisions on the ring 33 normally register with the corresponding subdivisions on the disc 20. Each revolution of the disc 20 causes an associated recording mechanism or turns indicator 36, that is designated as Dial hundreds in Fig. 2 of the drawings to move one division past a hairline 37 that extends transversely across a transparent window part thereof.

Figures 4, 5:
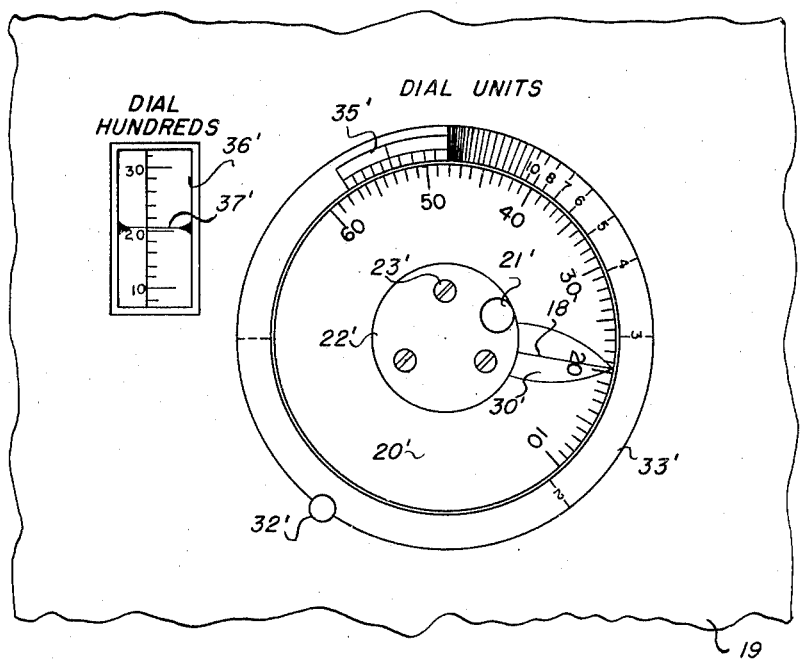

Fig. 4 illustrates a portion of a calibration sheet 40 indicating predetermined frequency values based upon the calibrations of the dial shown in Fig. 2. The combined readings taken from the scales on the dial members 20, 33 and 36 and the vernier 35 and applied to the calibration sheet 40 will be described in more detail later in the specification.

In the calibration of the device, the crystal oscillator 6 is used as a frequency standard. Switch 7 is closed and the dials 20 and 36 are set at the chart equivalent of the crystal freqency. The tuning capacitor 5 is adjusted to zero beat in the visual indicator 11 or sound reproducer 13. The switch 7 is then opened.

In the operation of the device, the antenna 1 is coupled to the mixer 3 by closing the mixer switch 2 and the audio amplifier switch 8 is set to apply the output from the mixer 3 to the audio amplifier stage 9. The sound reproducer switch 12 is then closed so that the output from the audio amplifier stage 9 is applied to the sound reproducer 13 as well as to the visual indicator 11. The audio amplifier stage 9 functions as a beat-frequency detector when so connected, if the frequency of the intercepted signal differs from the local oscillator frequency or a harmonic thereof by an amount within the audible range.

With the above connections established, radio energy that is intercepted by the receiving antenna 1 is fed into the circuit and is presented at both the sound reproducer 13 and at the visual indicator 11. In order to determine the frequency of a carrier or of a signal in the radio energy that is intercepted by the receiving antenna 1, disc 20 is rotated until a beat note is observed upon the visual indicator stage 11.

In the event that a beat note is observed upon the visual indication stage 11 the supposition follows that the output of the mixer 3 resulting from the beating of the oscillator 4 against the unknown frequency of the radio energy intercepted by the receiving antenna 1, is within the audio frequency range and the determination of the actual signal frequency proceeds. When a beat note is observed with the switch 8 in its audio position, the response is reduced to zero beat by adjusting the indicator disc 20 and the disc is locked in place by the tightening of the locking screw 32. With the disc 20 locked the movable runner arm 30 is set to zero position on the scale of the fixed ring 33.

The first or zero beat note determination involving the intercepted signal is obtained by taking the reading while the audio amplifier is still in use, on the scales of the turns indicator 36, the indicator disc 20 and the vernier 35 on the ring 33. Assuming the reading that is shown on the scales in Fig. 2 of the accompanying drawing to be an illustrative example, the scale on the turns indicator 36 reads "20" at its hairline 37; the scale on the indicator disc 20 reads "48" at the zero reference of the scale on the ring 33; and the vernier 35 on the ring 33 reads "5." These indications provide the reading "2048.5" for the illustrative determination.

The calibration chart 40 is then referred to for completing a first step in the determination of the frequency of the intercepted signal, where it is found that the determined beat frequency dial reading "2048.5" corresponds to a fundamental frequency of 128.63 megacycles per second. The frequency of the intercepted signal may be the fundamental frequency 128.63 megacycles per second or any of the harmonics thereof that are also shown on the chart 40.

The first step of the procedure that has been described thus far has involved the process of mixing the unknown radio frequency signal with signal from the local oscillator 4 and zero beating these two frequencies against each other. The zero beat frequency that is so established is caused by the fundamental frequency or a harmonic frequency of the local oscillator 4 beating against the frequency of the unknown signal.

In the next step of the present process the amplifier switch 8 is caused to engage the contact that connects the mixer 3 with the intermediate-frequency amplifier 10. With the amplifier switch 8 so positioned, the zero beat frequency that has been established is fed into the intermediate-frequency amplifier stage 10. The movable runner arm 30 has been positioned previously in alignment with the zero reference position on the scale of the fixed ring 33. The rotatable disc 20 is then released from its locked condition by the counter-clockwise rotation of the locking screw 32.

The disc 20 is then rotated clockwise and carries the runner arm 30 with it. During the movement of the disc 20 the visual indicator 11 is observed closely for a beat note response. A beat note response normally will be observed as the difference frequency beat of the mixer output coincides with the predetermined intermediate frequency. The system will preferably be arranged so that this beat note will take place within the first rotation of the disc 20 from the zero beat position. The beat note response that is observed on the visual indicator 11 is noted by taking the reading of the runner arm hairline 18 from the scale on the fixed ring 33. The number so noted is sought in line with the words "Dial shift reading" on the calibration chart 40 shown in Fig. 4 of the drawings. The number so noted indicates in the column thereabove in the chart 40 the particular harmonic of the local oscillator signal responsible for the beat note observed on the visual indicator 11.

For the purposes of discussion let it be assumed that the dial 20 has been rotated from its shown position until the hairline 18 on the runner arm 30 indicates 28 on the scale of the ring 33, as shown in Fig. 2 of the drawings wherein the dial 20 is not shown rotated but the runner 30 is. In such case, reading upwardly in the column footed by the numeral "28" on the chart 40 until we arrive at the reading that is in alignment with the previously determined beat note reading "2048.5," the number "257.26" is arrived at and, continuing upwardly of the same column, it is observed that the beat note that was located last utilized the second harmonic of the fundamental frequency of the local oscillator. The deduction therefore follows that the frequencies of the local oscillator 4 beating against the intercepted signal have a fundamental frequency of 128.63 megacycles per second, and that its second harmonic of 257.26 megacycles per second is the actual frequency of the signal that was intercepted by the receiving antenna 1 and passed therefrom to the mixer 3.

It will be observed in conclusion that the disclosed procedural method for determining the frequency of an intercepted signal of unknown frequency comprises a very few steps of easily performed manipulations followed by reference to a simple chart of pre-computed frequency values. The simplicity of the described method permits its delegation to workers who do not necessarily have the fundamental knowledge and skill that are required of operatives following the older, more established methods of frequency determinations.

A modification of the dial portion of the present device that is shown in Fig. 2, is shown in Fig. 5 of the accompanying drawing wherein corresponding parts are designated by corresponding reference numerals that are primed in Fig. 5 and are not primed in Fig. 2. Instead of the scale markings being equally spaced as on the ring 33 in Fig. 2, numbers 1, 2, 3, etc. on ring 33' in Fig. 5 are spaced from the zero reference clockwise by angles proportional to their reciprocals and equal to the angular displacements of dial 20' and adjustable index 18' necessary, at the frequency ranges of the fundamental or harmonic identified by the numbers, to produce the change from zero beat to the predetermined intermediate frequency beat.

In the dial modification that is shown in Fig. 5, the frequency calibration must be substantially linear. In the scale calibrations on the fixed ring 33' if the numeral 1 is at an angle of 270° with respect to the zero position; the numeral 2 is at an angle of 270°/2 or 135° with respect to the zero position; the numeral 3 is at an angle of 270/3 or 90° with respect to the zero position; etc. With this adaptation the dial shift readings comparable to those shown in the bottom line of the chart illustrated in Fig. 4 would not vary from page to page of the calibration book but would be repetitions on the succeeding pages of the book. With this modification the harmonic numbers are applied directly on the scale of the dial 33' and may be read directly therefrom. The remaining parts of the dial assembly that is shown in Fig. 5 substantially conform in operation and use with the corresponding parts that are indicated by corresponding unprimed numerals in Fig. 2 of the drawings.

An illustrative graph of determinations that have been compiled from experimental records using a heterodyne frequency meter having a fundamental frequency range of from 85 to 200 megacycles for supplying hypothetical intercepted signals is shown in Fig. 6 of the drawings.

The harmonic ranges of the heterodyne frequency meter are $n$ times 85 to 200 megacycle range where $n$ includes the small integers 2, 3, 4, 5 etc.

The curves that are shown in Fig. 6 indicate that for a given intermediate frequency A of one megacycle, a dial shift B that is inversely proportional to the harmonic number is required. In the graph that is shown in Fig. 6, both the frequency increment and the dial increment are shown enlarged 50 times for purposes of clarity of presentation. As set forth on the graph that is shown in Fig. 6, the value A is in magacycles and the value B is 44 units on the scale of the indicator disc 20 or is $44/100$ of one revolution thereof for a signal within the fundamental range. The value B also is $44/n$ units on the scale of the disc 20 where $n$ is a higher order of harmonic. The use of the vernier 35 provides means for obtaining a least count of $1/1000$ of one turn of the disc 20. This provides a least count of 0.0023 megacycle or 2.3 kilocycles on the fundamental and $n$ times this value on the harmonics.

The device and the method for the determination of the frequency of an intercepted unknown radio signal that are disclosed and described herein have been submitted for the purposes of illustrating and describing a suitable illustrative embodiment of and a method for practicing the present invention and limited modifications and changes that provide satisfactory comparable results may be made therein without departing from the present invention as defined by the appended claims.

What I claim is:

1. A device for determining the frequency band containing an incoming radio signal comprising a local oscillator producing a fundamental and a plurality of harmonic bands of frequencies, a mixer for combining the output frequencies of said oscillator with the incoming signal, means responsive to certain beat frequencies produced by said mixer, means having a substantially straight line frequency calibration for tuning said local oscillator including dial means adjustable to a first setting to produce a zero beat response and adjustable to a second setting to produce a predetermined intermediate frequency beat response, and calibrations on said dial means relative to the difference between the first and second dial settings to identify the fundamental or harmonic band causing the beats.

2. A device for determining the frequency band containing an incoming radio signal comprising a local oscillator producing a fundamental and a plurality of harmonic bands of frequencies, a mixer for combining the output frequencies of said oscillator with the incoming signal, means responsive to the beat frequencies produced by said mixer, means having a substantially straight line frequency calibration for tuning said local oscillator including dial means adjustable to a first setting to produce a first predetermined frequency beat response and adjustable to a second setting to produce a second predetermined frequency beat response, and index numbers on said dial means placed relative to the difference between the first and second dial settings to identify the fundamental or harmonic band causing the beats.

3. A method of determining the frequency band containing an incoming radio signal which comprises: generating a local signal having a fundamental and a plurality of harmonic bands of frequencies, mixing the local signal with the incoming signal, adjusting said frequencies of the local signal until the frequency of one band produces a zero beat with the incoming signal, varying the frequencies of the local signal until the frequency of said one band produces a predetermined intermediate frequency beat with the incoming signal, whereby the local signal variation between said beats identifies said one band producing the beats.

4. A method of determining the frequency band containing an incoming radio signal which comprises: generating a local signal having a fundamental and a plurality of harmonic bands of frequencies, mixing the local signal with the incoming signal, adjusting said frequencies of the local signal until the frequency of one band produces a first predetermined frequency beat with the incoming signal, varying the frequencies of the local signal until the frequency of said one band produces a second predetermined frequency beat with the incoming signal, whereby the local signal variation between said beats identifies said one band producing the beats.

HENRY H. GRIMM.

REFERENCES CITED

The following references are of record in the file of this patent:

UNITED STATES PATENTS

| Number | Name | Date |
|---|---|---|
| 1,934,879 | Potter | Nov. 14, 1933 |
| 2,131,559 | Granger | Sept. 27, 1938 |
| 2,245,717 | Roberts | June 17, 1941 |